US006845095B2

(12) United States Patent
Krishnarajah et al.

(10) Patent No.: US 6,845,095 B2
(45) Date of Patent: Jan. 18, 2005

(54) EFFICIENT HEADER HANDLING INVOLVING GSM/EDGE RADIO ACCESS NETWORKS

(75) Inventors: Ainkaran Krishnarajah, Stockholm (SE); Hannes Ekström, Aachen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 785 days.

(21) Appl. No.: 09/843,034

(22) Filed: Apr. 27, 2001

(65) Prior Publication Data

US 2002/0191556 A1 Dec. 19, 2002

(51) Int. Cl.[7] .................................................. H04J 3/24
(52) U.S. Cl. ...................................................... 370/349
(58) Field of Search ................................. 370/252, 310, 370/328, 342, 345–350, 351–353, 389, 431, 437, 469; 455/412, 422, 436–444, 67.1, 556

(56) References Cited

U.S. PATENT DOCUMENTS

| | | | |
|---|---|---|---|
| 6,104,929 A | | 8/2000 | Josse et al. |
| 6,134,434 A | | 10/2000 | Krishnamurthi et al. |
| 2002/0073234 A1 | * | 6/2002 | Ma .............................. 709/246 |
| 2002/0160785 A1 | * | 10/2002 | Ovesjo et al. .............. 455/453 |
| 2002/0193139 A1 | * | 12/2002 | Mildh et al. ................ 455/552 |
| 2003/0104816 A1 | * | 6/2003 | Duplessis et al. ........... 455/448 |
| 2003/0140114 A1 | * | 7/2003 | Katz et al. .................. 709/217 |
| 2003/0186695 A1 | * | 10/2003 | Bridges et al. .............. 455/432 |

FOREIGN PATENT DOCUMENTS

| | | |
|---|---|---|
| EP | 0 918 417 A2 | 5/1999 |
| GB | 2 350 257 A | 11/2000 |
| WO | 97/48212 A1 | 12/1997 |
| WO | 99/21307 A1 | 4/1999 |
| WO | 00/72155 A1 | 11/2000 |

OTHER PUBLICATIONS

3GPP TS 23.228, V5.0.0 (Apr. 2000), *3rd Generation Partnership Project: Technical Specification Group Services and System Aspects; IP Multimedia (IM) Subsystem—Stage 2 (Release 5)*.
3GPP TS 23.002, V5.0.0 (Apr. 2000), *3rd Generation Partnership Project: Technical Specification Group Services and System Aspects; Network Architecture (Release 5)*.

* cited by examiner

*Primary Examiner*—David Vincent
(74) *Attorney, Agent, or Firm*—Nixon & Vanderhye, P.C.

(57) ABSTRACT

To facilitate handing of headers for Internet-transmissible packets, a radio access network sends to a mobile station (MS) a message which downloads configuration options for each of corresponding plural header adaptation strategies. The mobile station (MS) elects one of the plural header adaptation strategies and includes the elected strategy in a return message, whereby the radio access network configures a radio bearer for packets to be transmitted between the radio access network and the mobile station. In a first illustrated mode of implementation of the invention, the radio access network is a GSM/EDGE radio access network, with the downloading message being a radio bearer setup message and the return message sent from the mobile station to the radio access network being a radio bearer setup complete message. In a second illustrated mode of implementation of the invention, the message that downloads configuration options for each of plural header adaptation strategies is a handover command message for handing over control of the mobile station from a source radio access network to a target radio access network. In this second mode, the message which informs which of the plural strategies is elected is a handover complete message. The plural header adaptation strategies can include header compression (useful, e.g., for a multimedia service); header removal (useful, e.g., for a spectrum efficient voice packet voice bearer that reuses codec-specific channel coding); and no header adaptation.

36 Claims, 8 Drawing Sheets

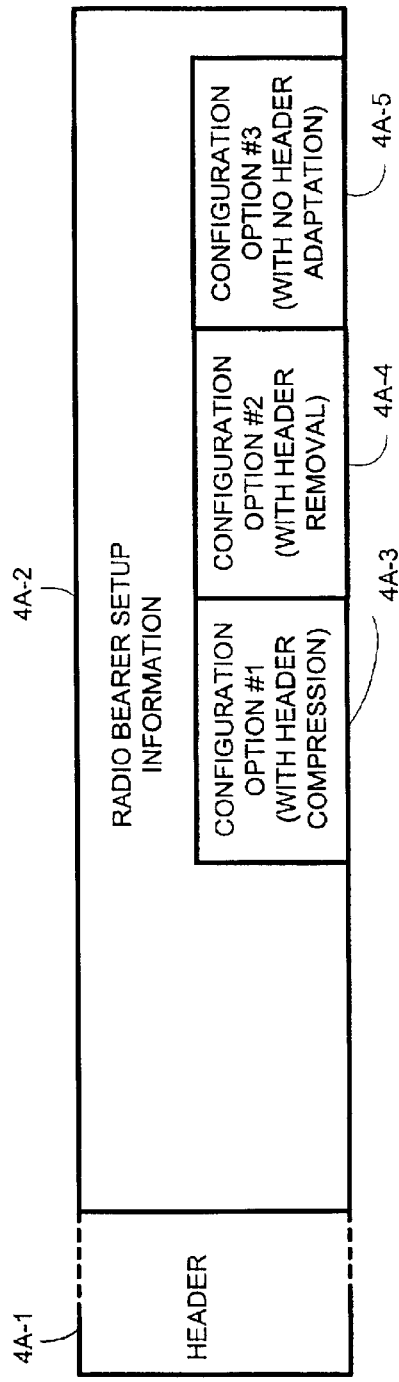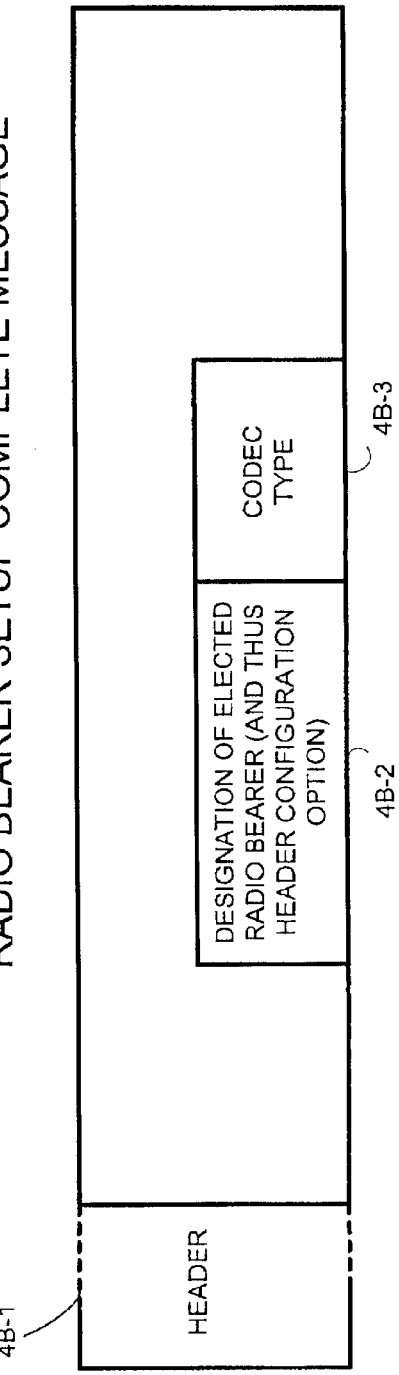

TYPICAL IP PACKET

TYPICAL IP PACKET FOR SPEECH

EFFICIENT HEADER HANDLING INVOLVING GSM/EDGE RADIO ACCESS NETWORKS

BACKGROUND

1. Field of the Invention

The present invention pertains to wireless telecommunications, and particularly to the handling of headers for Internet-transmissible packets in a radio access network having varied header handling capability.

2. Related Art and Other Considerations

In a typical cellular radio system, mobile stations (MSs) communicate via a radio access network (RAN) to one or more core networks. The mobile stations can be mobile terminals such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the mobile stations within range of the base stations. In the radio access network, several base stations are typically connected (e.g., by landlines or microwave) to a base station controller (BSC) which supervises and coordinates various activities of the plural base stations connected thereto.

Two examples of a radio access network is Global System for Mobile communications (GSM) developed in Europe and its third generation evolution GSM/EDGE Radio Access Netowrk (GERAN). Another example radio access network (which is also an evolution of GSM) is the Universal Mobile Telecommunications System (UMTS) Terrestrial Radio Access Network (UTRAN). UTRAN of UMTS is essentially a wideband code division multiple access (W-CDMA) system.

According to the basic architecture for the third generation radio access networks (RANs) is a master/slave relationship between the RAN and the mobile station. The mobile station is able to indicate its capabilities to the RAN. Based on the service that is requested by the mobile station (MS) and the capabilities of the mobile station (MS), the RAN makes a configuration choice and signals this configuration to the mobile station (MS) over the radio interface using radio resource control (RRC) signaling. The configuration must then be supported by the mobile station (MS). If the MS cannot support the configuration, a failure must be sent.

Some radio access networks, particularly including the GERAN (GSM/EDGE Radio Access Network), accommodate both circuit switched and packet switched connections. Many types of packet switched connections, including some of those which provide speech service, utilize internet protocol (IP).

A significant challenge in running a service based on internet protocol (IP) is the considerably large overhead (e.g., aggregate headers) of a packet in relation to the payload. FIG. 7A illustrates an example generalized internet protocol (IP) packet; FIG. 7B illustrates an example internet protocol (IP) packet for speech comprising a RTP/UDP/IP header and speech payload. The RTP/UDP/IP header header of FIG. 7B typically begins with either an IPv4 or IPv6 field (twenty or forty octets, respectively), and also includes a UDP field (eight octets), and an RTP header (twelve octets). In either the IPv4 or IPv6 scenario, the RTP/UDP/IP header has a greater length than the thirty-two octet speech payload of the internet protocol (IP) packet. Regarding RTP and UDP in general, see RTP: A Transport Protocol for Real-Time Applications, RFC 1889; and J. Postel, User Diagram Protocol, RFC 761, September 1980, both of which are incorporated herein in their entirety.

Because of the large inefficiency illustrated by FIG. 7A and FIG. 7B, various header compression (HC) schemes have been developed to ensure that the impact of the overhead (e.g., RTP/UDP/IP header size) on the efficiency spectrum is reduced. Various examples of header compression are found in the literature and certain industry specifications and standards, examples of which are listed below.

The internet engineering task force (IETF) is the standardization body which carries out development and standardization for protocols to be employed in the internet. The following header adaptation protocols have been specified in the IETF (all of which are incorporated herein by reference in their entirety):

S. Casner, V. Jacobson, "Compressing IP/UDP/RTP Headers for Low-Speed Serial Links", RFC 2508, February 1999.

Mikael Degermark, Bjorn Nordgren, Stephen Pink, "IP Header Compression", RFC 2507, February 1999.

M. Engan, S. Casner, C. Bormann, "IP Header Compression over PPP", RFC 2509, February 1999.

V. Jacobson, "Compressing TCP/IP Headers for Low-Speed Serial Links", RFC 1144, February 1990.

RFC 3095 Robust Header Compression (ROHC): Framework and Four Profiles: RTP, UDP, ESP, and Uncompressed.

RFC 3096 Requirements For Robust IP/UDP/RTP Header Compression.

For GERAN (GSM/EDGE Radio Access Network), an optimized voice bearer is currently being standardized which would provide a spectrum efficient way of transporting voice internet protocol packets originating in the Iu Interface (between the UTRAN and a core network) This spectrum efficiency is achieved by reusing the codec-specific channel coding from GSM over the air interface. To conform to the payload format of this channel coding, a procedure know as header removal (HR) is performed to remove the RTP/UDP/IP header before transporting the packets over the air interface. The RTP/IUDP/IP header may then generated after the air-interface. The standardization of the header removal algorithm to be employed by GERAN is under the responsibility of the Technical Specification Group GSM/EDGE Radio Access Network (TSG GERAN) group within the 3$^{rd}$ Generation Partnership Project (3GPP).

There are, however, other types of speech service potentially available in GERAN (GSM/EDGE Radio Access Network). For example, a general multimedia (MM) bearer with true multimedia (MM) capabilities and transparent IP connectivity is envisioned. See, e.g., 3GPP TS 23.228, V5.0.0 (2001-04), 3$^{rd}$ Generation Partnership Project: Technical Specification Group Services and System Aspects; IP Multimedia (IM) Subsystem—Stage 2 (Release 5); and 3GPP TS 23.002, V5.0.0 (2000-12), 3$^{rd}$ Generation Partnership Project: Technical Specification Group Services and System Aspects; Network Architecture (Release 5). This general IP multimedia (MM) bearer is to provide transparent IP connectivity and enable sessions where speech is but one of the possible media types (other possible media types are video, shared white-board, streaming, etc.). Transparency in this context means that the IP headers arrive unchanged at the end terminal (this cannot be guaranteed by the header removal scheme employed on the optimized voice bearer). Transparency is a prerequisite for providing synchronization between different media. The multimedia (MM) bearer can utilize header compression (such as one of the compression techniques discussed above), or alternatively have no header adaptation mechanism in order to facilitate this transparency.

While GERAN supports header compression protocols such as various ones listed above, the strategy proposed for optimized speech in GERAN to date involves utilization of header removal for the reasons above mentioned. Header removal strips the internet protocol (IP) headers and transmits only the payload. However, at least initially in header removal, state information may be exchanged between peer entities to ensure that regeneration of the internet protocol (IP) headers is possible.

The above-mentioned Iu Interface is an open standardized interface that can be used for many different radio access networks (RANs). Currently, the Iu Interface is used for the UMTS Terrestrial RAN (UTRAN), as described (for example) in 3GPP TS 25.413. The Iu Interface can now also be used for GERAN (GSM/EDGE Radio Access Network). Since the Iu Interface is an open interface, it would extremely undesirable to modify the set of possible radio access bearer (RAB) attributes and value ranges involved with the Iu Interface for the purpose of configuring GERAN specific parameters. In fact, modifying the possible radio access bearer (RAB) attributes and value ranges would change the existing quality of service concept for all radio access networks that use the Iu Interface.

What is needed, therefore, and an object of the present invention, is a technique for correctly configuring radio bearers for appropriate RTP/UDP/IP header optimization or adaptation schemes in an efficient way within existing network architectural concepts.

BRIEF SUMMARY OF THE INVENTION

To facilitate handing of headers for Internet-transmissible packets, a radio access network sends to a mobile station (MS) a message which downloads configuration options for each of corresponding plural header adaptation strategies. The mobile station (MS) elects one of the plural header adaptation strategies and includes the elected strategy in a return message, whereby the radio access network configures a radio bearer for packets to be transmitted between the radio access network and the mobile station.

In a first illustrated mode of implementation of the invention, the radio access network is a GSM/EDGE radio access network. The downloading message sent from the radio access network and the return message are both radio resource control (RRC) messages. In particular, the downloading message is a radio bearer setup message and the return message sent from the mobile station to the radio access network is a radio bearer setup complete message.

In a second illustrated mode of implementation of the invention, the message that downloads configuration options for each of plural header adaptation strategies is a handover command message for handing over control of the mobile station from a source radio access network to a target radio access network. In this second mode, the message which informs which of the plural strategies is elected is a handover complete message. In this second mode, the target radio access network generates the configuration options for each of the plural header adaptation strategies and sends the configuration options from the target radio access network to a source radio access network. The source radio access network then sends the configuration options from the source radio access network to the mobile station. In the illustrated implementation, one of the target radio access network and the source radio access network is a GSM/EDGE (GERAN) radio access network and another of the target radio access network and the source radio access network is a UTRAN (Universal Mobile Telecommunications radio access network).

The plural header adaptation strategies included in the downloading radio resource control (RRC) message can include header compression (useful, e.g., for a multimedia service); header removal (useful, e.g., for a spectrum efficient packet voice bearer that reuses codec-specific channel coding); and no header adaptation.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4A is a diagrammatic view of an example radio bearer setup message according to an embodiment of the invention.

FIG. 4B is a diagrammatic view of an example radio bearer setup complete message according to an embodiment of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
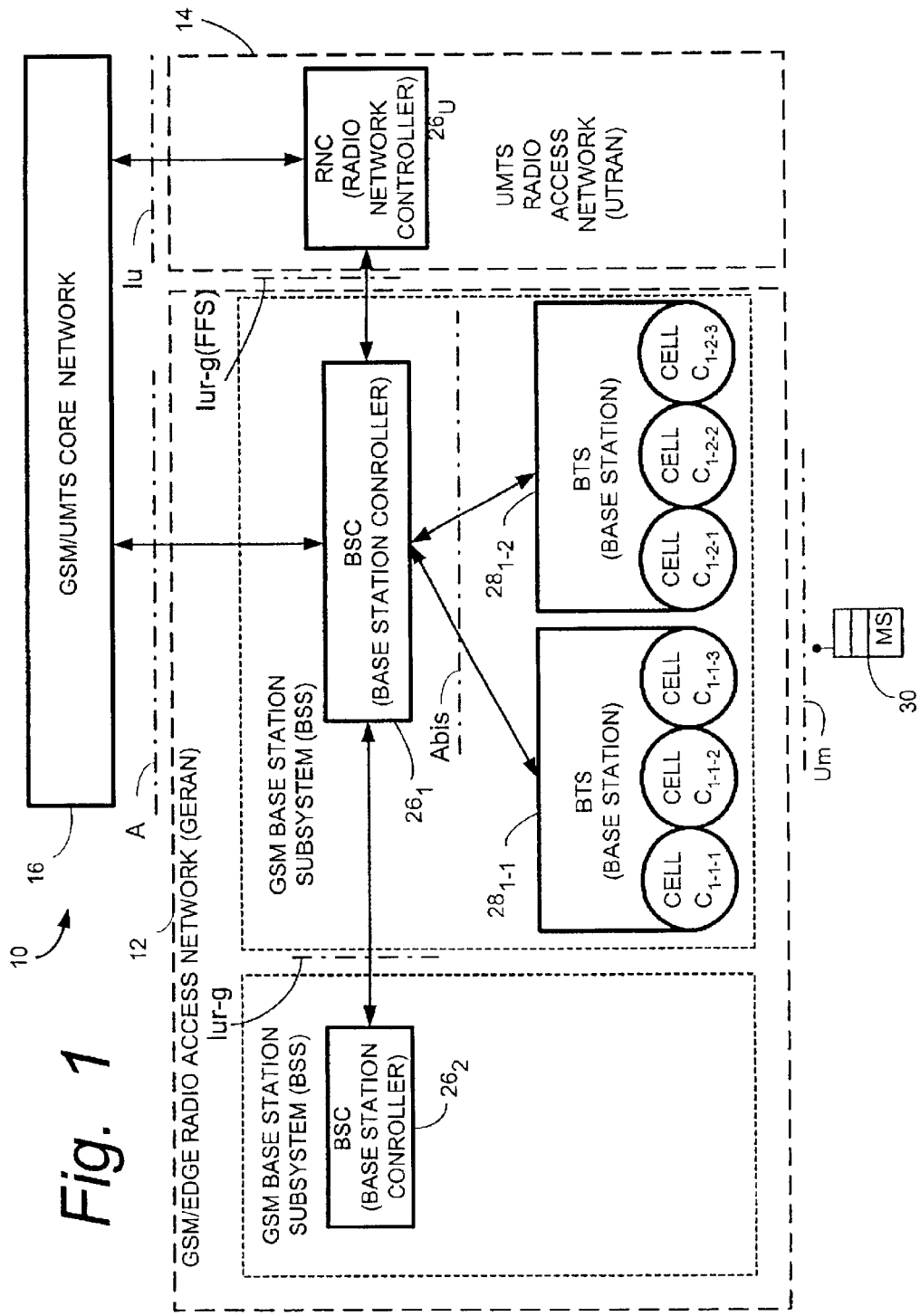
FIG. 1 is diagrammatic view of example telecommunications system in which the present invention may be advantageously employed.

FIG. 1 shows a telecommunications system 10 operating in conjunction with both a first radio access network 12 having a first type radio access technology and a second radio access network 14 having a second type radio access technology. In the non-limiting example shown in FIG. 1, the first radio access network 12 uses GSM/EDGE radio access technology (GERAN), while the second radio access network 14 uses UTRAN radio access technology. Both first radio access network 12 and second radio access network 14 are connected to an external core network 16, such may be (for example) the Public Switched Telephone Network (PSTN) and/or the Integrated Services Digital Network (ISDN).

The core network 16 can connect to the first radio access network 12 (e.g., the GERAN) over either an interface known as the A interface, an interface known as the Gb interface, or the above mentioned open Iu interface, or any combination of these three interfaces. In FIG. 1, it is assumed that the first radio access network is only connected over the Iu interface. The first radio access network 12 includes one or more base station controllers (BSCs) 26, with each base station controller (BSC) 26 controlling one or more base stations (BTSs) 28. In the example shown in FIG. 1, base station controller (BSC) $26_1$ is connected across the Abis interface to two base stations, particularly base station (BTS) $28_{1-1}$ and base station (BTS) $28_{1-2}$. Each base station (BTS) $28_1$ is depicted in FIG. 1 as serving three cells C. Each cell C is represented by a circle proximate the respective base station. Thus, it will be appreciated by those skilled in the art that a base station may serve for communicating across the air interface for more than one cell, and that differing base stations may serve differing numbers of cells.

FIG. 1 also shows that the GERAN typically comprises plural base station controllers (BSCs) 26, although only two of such base station controllers, particularly base station controllers (BSCs) $26_1$ and $26_2$, are illustrated. For simplicity, details of the base station subsystem (BSS) involving base station controller (BSC) $26_2$ are omitted, it being understood that, like the base station subsystem of base station controller (BSC) $26_1$, the base station subsystem of base station controller (BSC) $26_2$ also has its base stations. The base station controllers 26 control radio resources and radio connectivity within a set of cells. Each base station (BTS) 28 handles the radio transmission and reception within one or more cells.

The core network 16 also connects to the second radio access network 14 (e.g., the UTRAN radio access network) over an interface know as the Iu interface. The second radio access network 14 includes one or more radio network controllers (RNCs) $26_U$. For sake of simplicity, the UTRAN 14 of FIG. 1 is shown with only one RNC node. Although not expressly depicted as such in FIG. 1, the RNC node $26_U$ is connected to a plurality of base stations (e.g., node Bs). In second radio access network (UTRAN network) 14, the radio network controller (RNC) $26_U$ controls radio resources and radio connectivity within a set of cells, while the base stations handle the radio transmission and reception within one or more cells.

Figure 2:
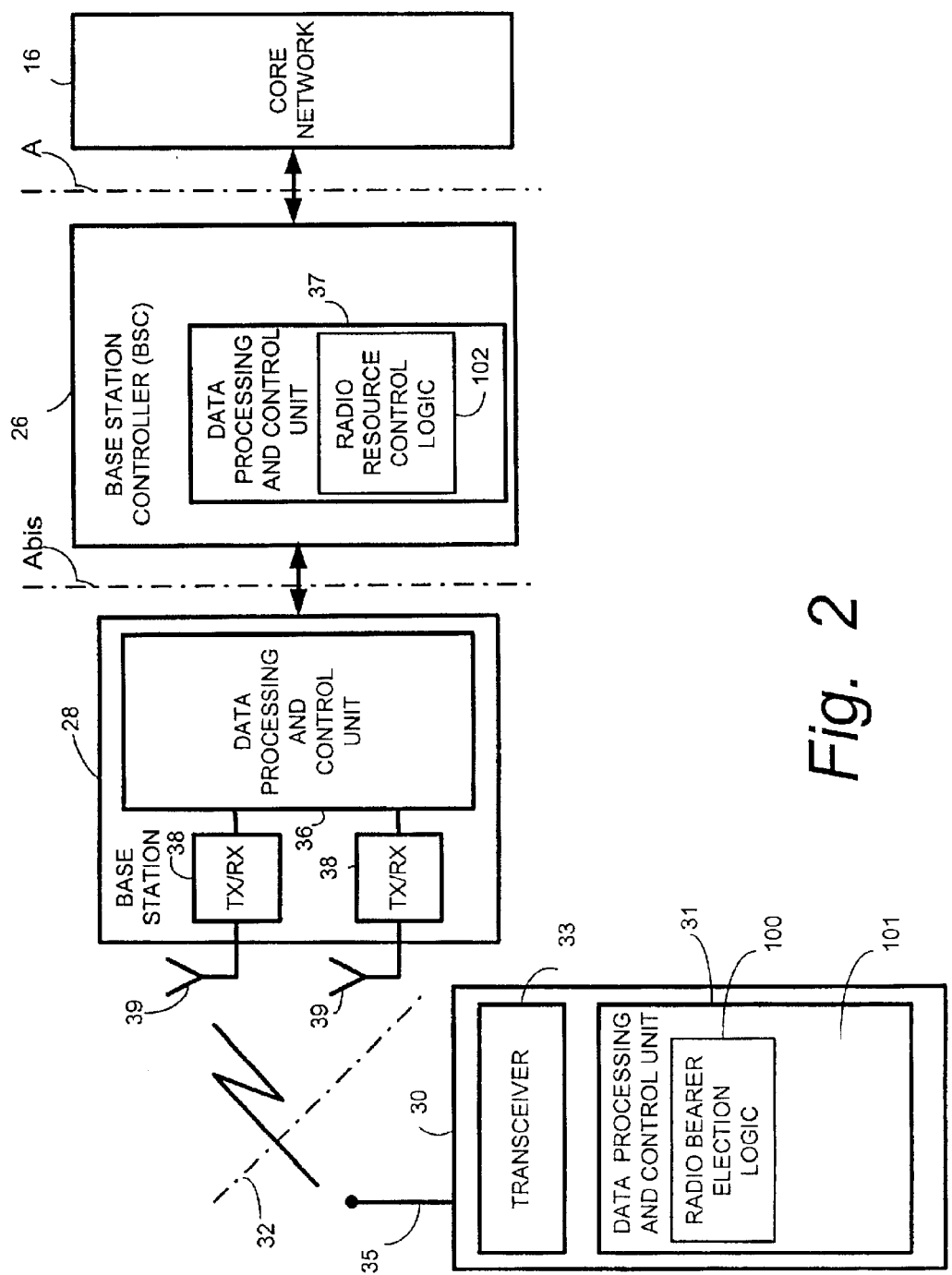
FIG. 2 is a simplified function block diagram of a portion of a GSM/EDGE Radio Access Network, including a mobile station (MS); a base station controller (BSC); and a base station (BS).

The Abis interface, a radio interface Um, the Iu interface, and the other interfaces are shown by dash-dotted lines in FIG. 1 and FIG. 2.

FIG. 2 shows selected general aspects of mobile station (MS) 30 and selected functionalities of nodes such as base station controller (BSC) 26 and base station (BS) 28. The mobile station (MS) 30 shown in FIG. 2 includes a data processing and control unit 31 for controlling various operations required by the mobile terminal (MT). The data processing and control unit 31 of mobile terminal (MT) 30 includes radio bearer election logic 100, the purpose of which is described in more detail subsequently. In addition, the data processing and control unit 31 provides control signals as well as data to a radio transceiver 33 connected to an antenna 35.

The example base station (BTS) 28 shown in FIG. 2 includes a base station data processing and control unit 36, which is connected to one or more base station transceivers (TX/RX) 38. Each base station transceiver (TX/RX) 38 is connected to a corresponding antenna 39 which communicates over air interface Um with mobile station (MS) 30.

The example base station controller (BSC) 26 shown in FIG. 2 includes a BSC data processing and control unit 37. The BSC data processing and control unit 37 includes radio resource control logic 104. It should be understood by the person skilled in the art that any or all of radio bearer election logic 100 and radio resource control logic 104 may be implemented using individual hardware circuits, using software functioning in conjunction with a suitably programmed digital microprocessor or general purpose computer, using an application specific integrated circuit (ASIC), and/or using one or more digital signal processors (DSPs)

The present invention pertains to the handing of protocol overhead, e.g., headers, for internet-transmitted packets. In this regard, the present invention concerns a method of operating a radio access network to achieve the desired handling of the headers; a node of the radio access network, and a mobile station which cooperates with the radio access network in the handling of the headers. As employed herein "header" and "header adaptation" refers to the protocol overhead for internet-transmissible or internet-transmitted packets. Internet-transmissible or internet-transmitted packets/services are generally based on the Internet Protocol (IP) [see, RFC 791, Internet Protocol, September 1981]. Examples of such internet-transmissible or internet-transmitted packets/services encompass both speech packets/services and other packets/services (e.g., non-speech or non-voice packets/services). While the embodiments and modes subsequently illustrated herein predominately concern RTP/UDP/IP speech packets which have RTP/UDP/IP headers as protocol overhead, it should be understood that the present invention is not limited to RTP/UDP/IP speech packets nor even to speech packets generally.

Figure 3:
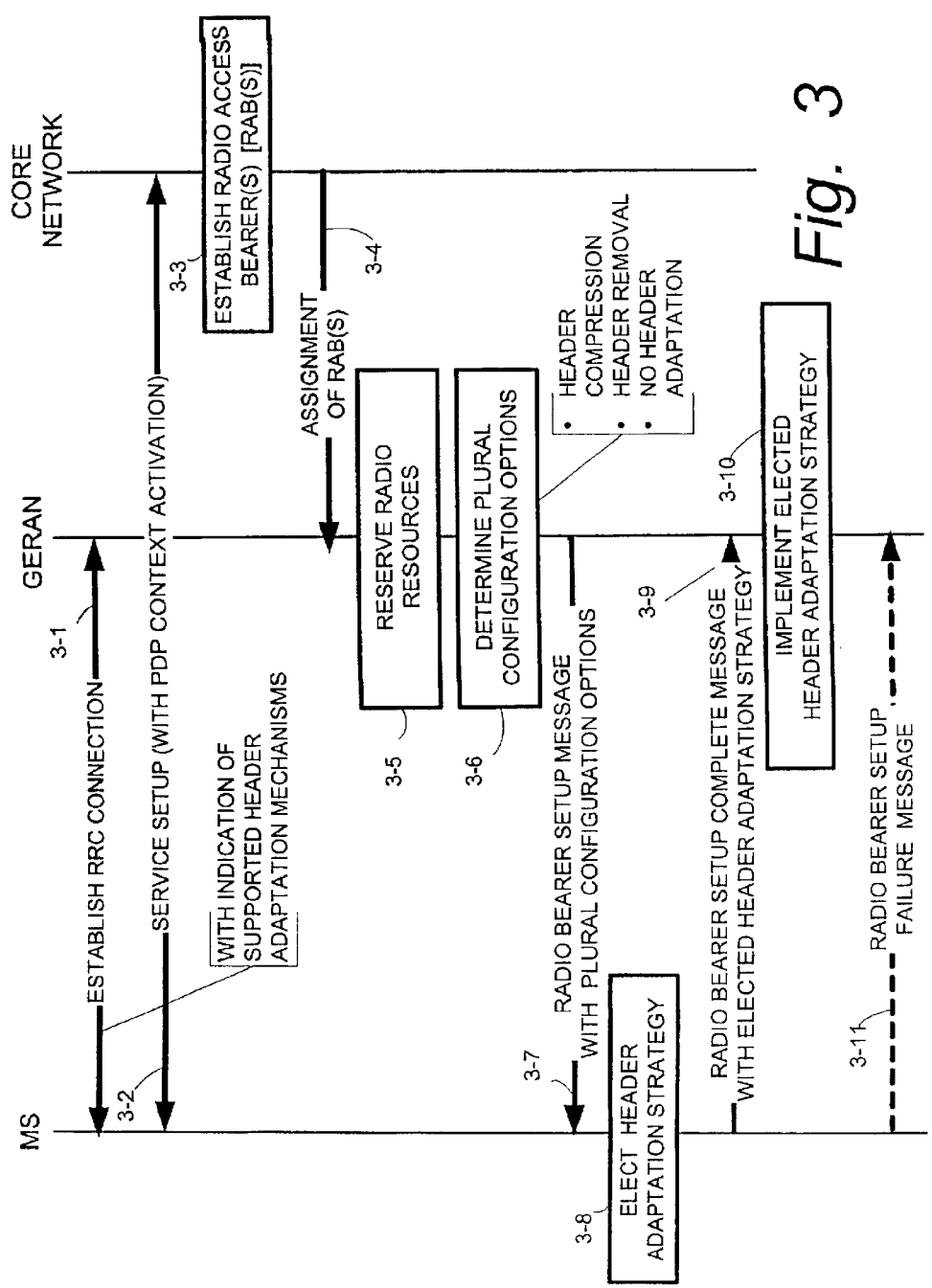
FIG. 3 is a diagram showing various events involved in setting up a packet switch internet protocol (IP) voice service according to a first mode of the present invention.

In a first illustrated mode of implementation of the invention, the radio access network is a GSM/EDGE radio access network. The downloading message sent from the radio access network and the return message are both radio resource control (RRC) messages. In particular, the downloading message is a radio bearer setup message and the return message sent from the mobile station to the radio access network is a radio bearer setup complete message. FIG. 3 shows various events involved in setting up a packet switch internet protocol (IP) voice service between the mobile station (MS) and GERAN for one example implementation of the first mode of the present invention.

Event 3-1 represents establishment of a radio resource control (RRC) connection. Subsumed in event 3-1 is the mobile station (MS) 30 sending a request that a radio resource control (RRC) connection be established; the GERAN responding with a message to the mobile station (MS) 30 for setting up the RRC connection; and, the mobile station (MS) 30 replying with a confirmation that the RRC connection setup is successful. This confirmation is also known as a "RRC Connection Setup Complete" message. In the "RRC Connection Setup Complete" message, mobile station (MS) 30 indicates to the radio access network which header adaptation mechanisms it supports.

In a more detailed implementation of the first mode, various messages are structured to have multiple layers of information elements. In this detailed implementation, information elements can have a hierarchial structure. For example, the "RRC Connection Setup Complete" message just mentioned can include plural information elements such as those listed in Table 6. Noteable among the information elements of the "RRC Connection Setup Complete" message is a first layer information element entitled "UE radio access capability". Second layer information elements comprising the information element "UE radio access capability" are listed and described in Table 7, and particularly include the information element "PDCP capability". Third layer information elements comprising the information element "PDCP capability" are listed and described in Table 8, and particularly include the information elements "Support for Header Removal" and "Support for RFC3095". Thus, in this more detailed implementation, the information elements "Support for Header Removal" and "Support for RFC3095" indicate which header adaptation mechanisms are supported by mobile station (MS) 30.

Event 3-2 involves service setup, and includes direct transfer messages (sent from mobile station (MS) 30 to the core network 16) carrying higher layer messages that set up the service with the core network 16. Part of the service setup of event 3-2 IS A PDP context setup. During the PDP context setup the mobile station (MS) 30 communicates the quality of service (QoS) profile, which is a request for a certain quality of service which the core network 16 should attempt to provide.

Assuming that the core network 16 has sufficient resources to establish the service requested in event 3-2, as event 3-3 a radio access bearer(s) [RAB(s)] is established for use by the service. Event 3-4 of FIG. 3 shows core network 16 communicating assignment of the RAB(s) to the GERAN 12. The radio access bearer (RAB) contains a certain set of attributes that determine the characteristics of the RAB. The mapping between the QoS profile and the RAB attributes has been performed in the core network 16.

After the RAB assignment of event 3-4 is received at GERAN 12, and particularly at base station controller (BSC) node 26, as event 3-5 GERAN 12 reserves the appropriate radio resources required by the RAB assignment. Further, as event 3-6, GERAN 12 determines suitable configuration options for each of corresponding plural header adaptation strategies. For example, as event 3-6 GERAN 12 can prepare a first configuration option which includes or pertains to a header compression strategy; a second configuration option which includes or pertains to a header removal strategy; and, a third configuration option which accommodates a strategy of no header adaptation. The options prepared by GERAN 12 as event 3-6 can, in the illustrated embodiment, be prepared primarily or partially by radio resource control logic 104.

As event 3-7 the base station controller (BSC) node 26 of GERAN 12 sends a radio bearer setup message to mobile station (MS) 30. In the illustrated embodiment, the radio bearer setup message of event 3-7 is sent on the PDTCH or main DCCH logical channel, but the invention is not limited to a particular logical channel. The radio bearer setup message of event 3-7 includes each of the plural configuration options which were determined at event 3-6 as being possible for the RAB assignment.

In the above regard, FIG. 4A illustrates an example format of portions of a radio bearer setup message germane to the present invention. FIG. 4A assumes that the radio bearer setup message includes a header (e.g., shown by the broken line portion 4A-1), and further illustrates as 4A-2 various radio bearer setup information elements. The radio bearer setup information depicted as 4A-2 includes three configuration option information elements (IEs), particularly information element(s) 4A-3 through information element(s) 4A-5. The information element(s) depicted as 4A-3 can be used for possible implementation of the first configuration option, e.g., the header compression strategy for the multimedia bearer. The second configuration option information element(s) depicted as 4A-4 can be used for possible implementation of the header removal strategy for the optimized speech bearer. The third configuration option information element(s) depicted as 4A-5 can be used for possible implementation the of strategy having no header adaptation.

Briefly mentioned above in conjunction with event 3-1 was a more detailed implementation of the first mode having multiple hierarchial layers of information elements. In an example of this detailed implementation, the radio bearer setup message has a first layer of information elements, examples of which are listed and described in Table 1. Among the first layer of information elements is an information element entitled "RAB information for setup". The information element entitled "RAB information for setup" comprise a second layer of information elements which are listed and described in Table 2. Notable among these second layer information elements is the information element entitled "RB information to setup". The information elements comprising the information element entitled "RB information to setup" form a third layer of information elements which are listed and described in Table 3. One of the these third layer information elements is the information element entitled "PDCP info". The information elements comprising the information element entitled "PDCP info" form a fourth layer of information elements which are listed and described in Table 4. Included as fourth layer information elements comprising the "PDCP info" are the following information elements: "Header Adaption information"; "Header Removal supported"; "Header Removal Specific parameters"; and "RFC3095 supported".

Concerning the above-mentioned information elements of Table 4, the "Header Removal supported" and "Header Removal Specific parameters" information elements generally correspond to second configuration option information element(s) depicted as 4A-4 of FIG. 4A, while the "RFC3095 supported" information element generally corresponds to the first configuration option, e.g., the header compression option information element(s) depicted as 4A-3 of FIG. 4A.

Concerning the "Header Removal Specific parameters" mentioned above, depending on the characteristics of the header removal algorithm defined in TSG GERAN, real time protocol (RTP) (such as time stamps and sequence numbers) may also be included in this information element.

Specific parameters included in the one or more information items of set 4A-4 (for header compression) are essentially the same as those listed in 3GPP TS 25.331, V4.0.0, Radio Resource Control Protocol, i.e., the IETF protocols, RFC 2507 and RFC 3095. Currently the only protocol planned for support protocols in GERAN is the protocol RFC 3095.

If the radio access network determines, e.g., on the basis of the of the establish RRC connection messages (and particularly the "RRC Connection Setup Complete" message) of event 3-1 that the radio access network does not support any of the header adaptation techniques which are supported by mobile station (MS) 30, the radio access network has to set up or configure a radio bearer with no header adaptation. Setup of such a radio bearer with no header adaptation is indicated in the radio bearer setup message of event 3-7 by the information element "Header Adaption information" (an information element listed in the "PDCP info" of Table 4) being set to "NOT". Therefore, the "Header Adaption information" being set to "NOT" generally corresponds to the third configuration option, e.g., the no header adaptation option information element(s) depicted as 4A-5 of FIG. 4A.

Thus, from the foregoing it is evident that the radio access network can structure or format the radio bearer setup message according to any of the following alternatives: (1) including only information elements for the optimized speech bearer; (2) including only information elements for the IP multimedia bearer; (3) including the information elements listed for the optimized speech bearer and the information elements listed for the IP multimedia bearer if mobile station (MS) 30 is allowed to choose the radio bearer to be set up; or (4) providing no header adaptation.

Upon receipt of the radio bearer setup message, as event 3-8 the mobile station (MS) 30 uses its own logic and discretion to elect one of the radio bearers listed in the radio bearer setup message, and thus one of the header adaptation strategies provided by the radio bearer setup message. In the illustrated embodiment, radio bearer election logic 100 of mobile station (MS) 30 can perform the election of event 3-8. It is the mobile station (MS) 30 which has complete knowledge of all the service requirements, e.g., the codec type needed and whether header removal or header compression are appropriate. After the election, the mobile station (MS) 30 communicates the elected radio bearer, and thus the header adaptation strategy, in a radio bearer setup complete message which is transmitted to the GERAN 12 as depicted by event 3-9 in FIG. 3.

FIG. 4B illustrates an example format of portions of a radio bearer setup complete message, including a header 4B-1 and a set of one or more information items or elements 4B-2 which specify which radio bearer, and hence which header adaptation strategy, was elected and thus is to be used: the optimized voice bearer (with its header removal strategy), the multimedia bearer (with its header compression), or no header adaptation. The set of information elements 4B-2 implicitly accepts the parameters suggested by the radio access network in the radio bearer setup message. In case the optimized voice bearer is to be setup, the mobile station (MS) 30 may also indicate by an information item/element 4B-3 in the radio bearer setup complete message which codec type is to be utilized. In view of the fact that the codec type information item 4B-3 is only for the case of the optimized voice bearer, information item is shown by broken lines in FIG. 4B.

The type of codec to be used ordinarily will have been negotiated previously by session initiation protocol SIP, but needs to be communicated to GERAN in order for GERAN to apply the correct channel coding. Regarding SIP, see M. Handley, H. Schulzrinne, E. Schooler and J. Rosenberg, SIP: Session Initiation Protocol, RFC 2543, August 2000; and M. Handley and V. Jacobson, SDP: Session Description Protocol, RTC 2327, April 1998, both of which are incorporated by reference in their entirety. To date, the following codec types will have to be supported on an optimized voice bearer: half rate (HR), full rate (FR), enhance full rate (EFR), and adaptive multirate (AMR)

Again referring to the more detailed implementation first mentioned above in conjunction with event 3-1 (with its multiple hierarchial layers of information elements), in one example of this detailed implementation the radio bearer setup complete message of the present invention has the information elements listed and described in Table 5. Included as one of the information elements in Table 5 is the information element "Header Adaption Info". The mobile station (MS) 30 can indicate that the strategy of no header adaptation is to be utilized by not including the information element "Header Adaption Info" in the radio bearer setup complete message. Alternatively, the mobile station (MS) 30 can set the information element "Header Removal" to indicate that the header removal strategy associated with the optimized voice bearer is to be utilized. In this case, information such as the source and destination IP addresses and UDP port numbers could be included in this message if they have not been conveyed to the RAN by other means. Also, the codec to be used will be included in this information element. Alternatively, the mobile station (MS) 30 can set the information element "RFC 3095" to indicate that the header compression strategy associated with multimedia bearer is to be utilized.

Event 3-10 of FIG. 3 shows GERAN 12 implementing the elected header adaptation strategy.

In the event that mobile station (MS) 30 is unable to setup the radio bearer, instead of the radio bearer setup complete message the mobile station (MS) 30 returns a radio bearer setup failure message (indicated by the broken line of event 3-11 of FIG. 3).

In a second illustrated mode of implementation of the invention, the message that downloads configuration options for each of plural header adaptation strategies is a handover command message for handing over control of the mobile station (e.g., all the connections with which the mobile station is involved) from a source radio access network to a target radio access network. In this second mode, the message which informs which of the plural strategies is elected is a handover complete message. In this second mode, the target radio access network generates the configuration options for each of the plural header adaptation strategies and sends the configuration options from the target radio access network to a source radio access network. The source radio access network then sends the configuration options from the source radio access network to the mobile station. In the illustrated implementation, the target radio access network is a GSM/EDGE (GERAN) radio access network and the source radio access network is a UTRAN (Universal Mobile Telecommunications radio access network).

Figure 5:
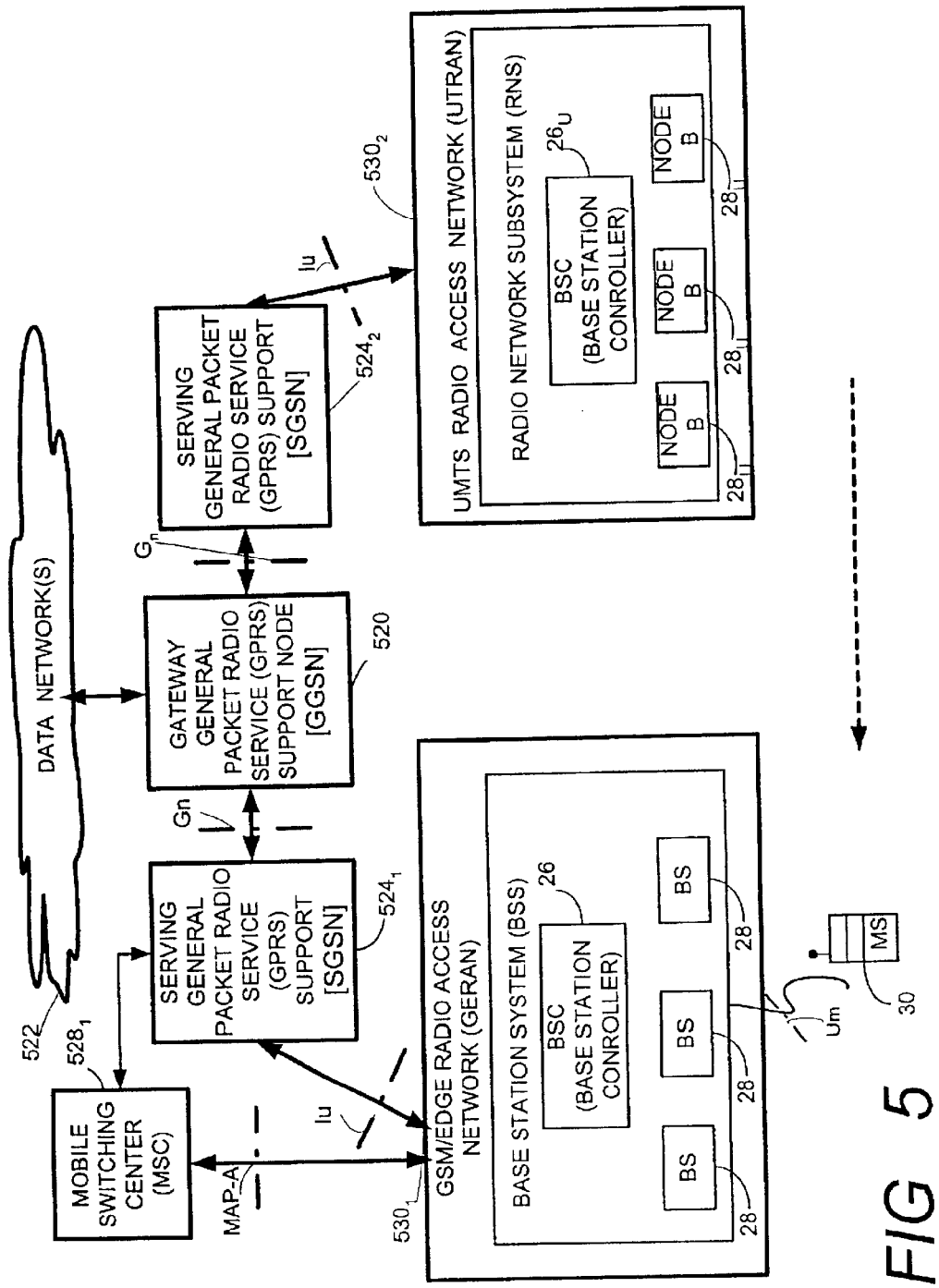
FIG. 5 is diagrammatic view of example telecommunications system in which the present invention may be advantageously employed in accordance with a second mode of the invention.
Figure 7A:
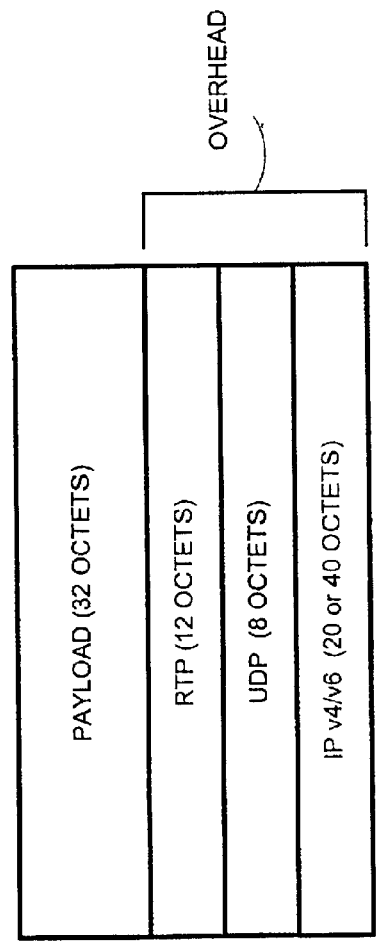
FIG. 7A is a diagrammatic view of a generalized Internet Protocol (IP) packet showing basic contents and size of a typical payload size and the related protocol overhead.
Figure 7B:
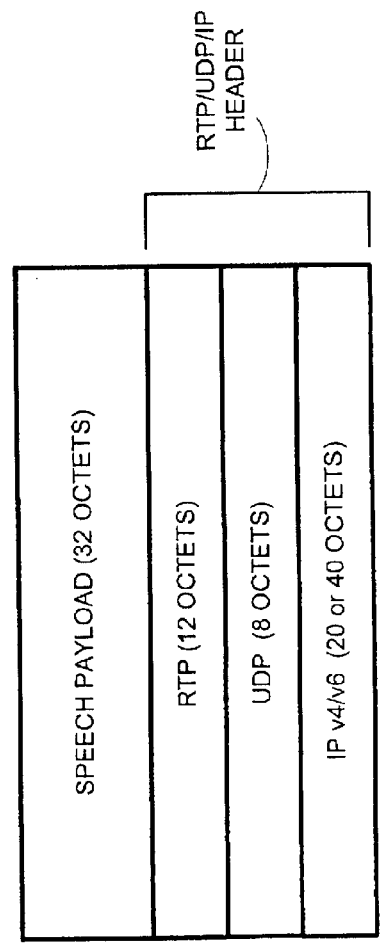
FIG. 7B is a diagrammatic view of an RTP/UDP/IP speech packet showing basic contents and size of a typical payload size and the related protocol overhead.

FIG. 5 shows more details of the example telecommunications system, particularly for illustrating the second mode of the invention. FIG. 5 shows that gateway general packet radio service (GPRS) support node (GGSN) 520 is connected to one or more data networks, such as the Internet, as represented by cloud 522. GGSN 520 communicates over a Gn interface with one or more serving general packet radio service support nodes (SGSN), of which two representative SGSNs are shown as $524_1$ and $524_2$. The SGSN $524_1$ communicates, e.g., with mobile switching center (MSC) node $528_1$ over a Gs interface; and over an Iu interface with base station system (BSS) $530_1$ of a first of two radio access networks, i.e., GERAN 12. The base station system (BSS) $530_1$ of GERAN 12 comprises one or more base station controllers 26, controlling plural base stations (BSs) 28, in the manner illustrated in FIG. 1. A second SGSN $524_2$ is connected to GGSN 520, and further communicates, e.g., over an Iu interface with radio network subsystem (RNS) $530_2$ of a second of two radio access networks, i.e., UTRAN 14. The radio access system (RNS) $530_2$ of UTRAN 14 comprises one or more base station controllers $26_U$, controlling plural base stations (Node Bs) $28_U$, as understood from FIG. 1. Further details of a Serving GPRS Support Node (SGSN), and various aspects of operation thereof included packet data protocol (PDP) context, are described in U.S. Pat. No. 6,104,929, entitled "Data Packet Radio Service With Enhanced Mobility Management", which is incorporated herein by reference in its entirety.

Figure 6:
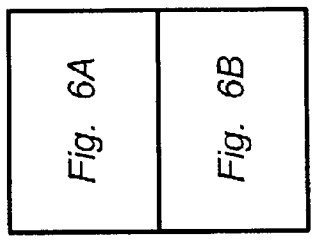
FIG. 6 is a diagrammatic view showing a relationship between FIG. 6A and FIG. 6B.
Figure 6A:
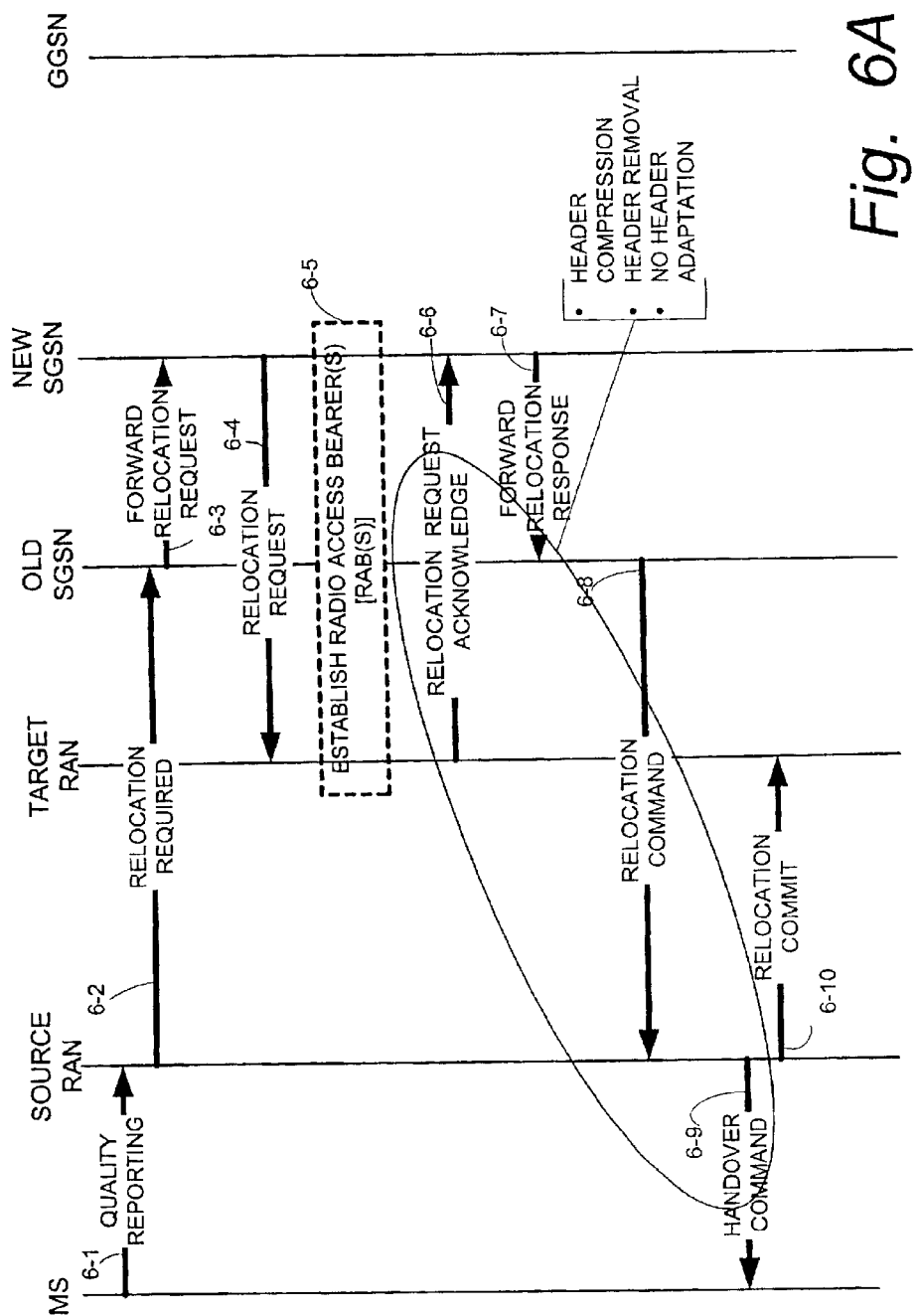
FIG. 6A and FIG. 6B are diagrammatic views showing various events involved in an inter-radio access network handover and thus a second example mode of the present invention.
Figure 6B:
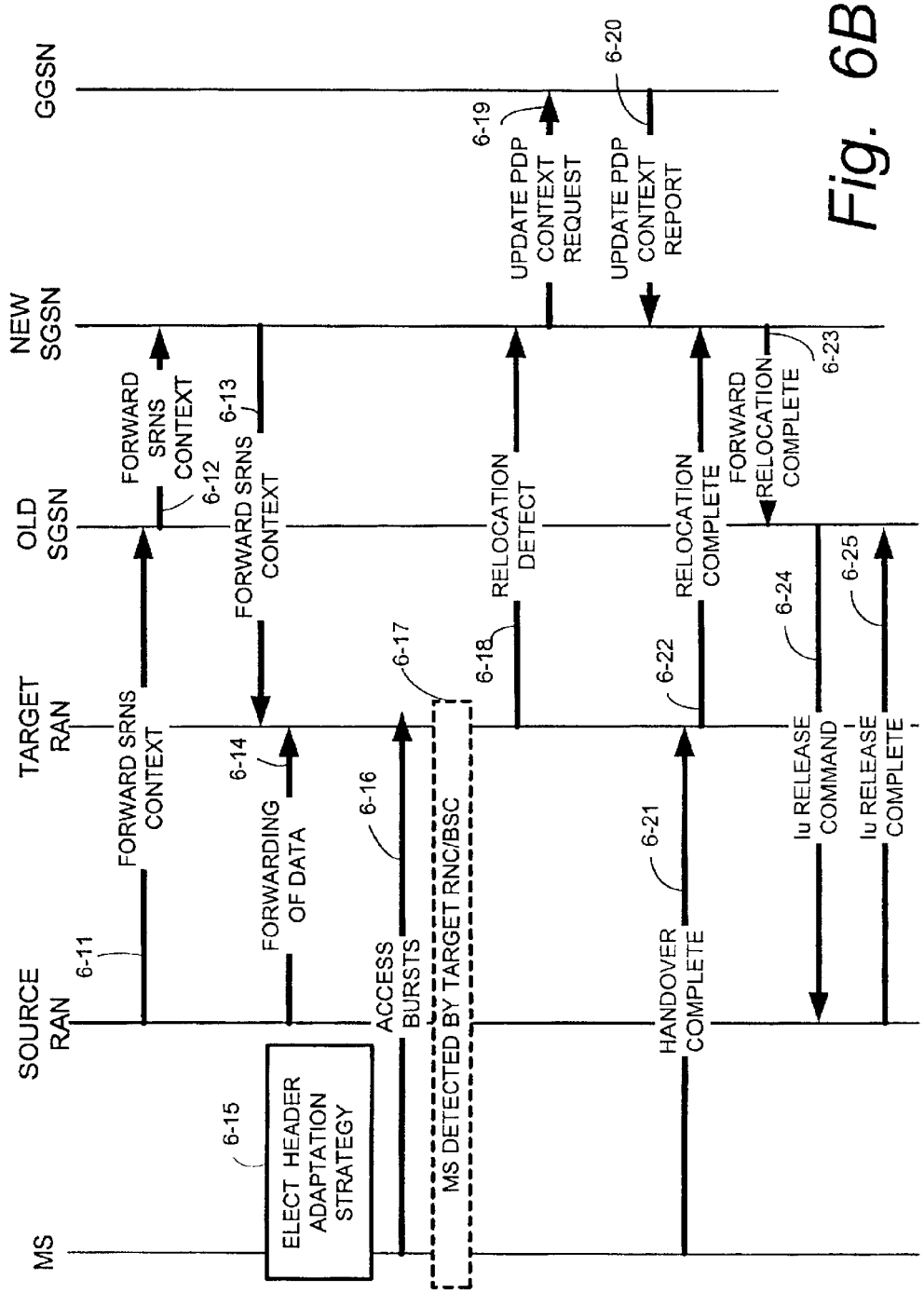

FIG. 6, which comprises both FIG. 6A and FIG. 6B, shows various events involved in a handover of a mobile from a source radio access network (e.g., UTRAN 14) to a target radio access network (e.g., GERAN 12). While the illustrated handover occurs from UTRAN 14 to GERAN 12, it should be understood that the present invention is not limited to this type of handover, and that a handover from GERAN 12 to UTRAN 14 is also within the ambit of the present invention, and that the present invention also covers other types of handovers involving yet other types of radio access networks.

Event 6-1 depicts mobile station (MS) 30 supplying quality measurements (e.g., signal quality measurements) to the Source RAN (e.g., UTRAN 14). Based on the measurements reported as event 6-1, the Source RAN decides to carry out a handover to the target RAN. In view of this handover decision, a transparent container is transported from the Source RAN to the target RAN, as reflected by events 6-2 through 6-4 of FIG. 6. This transparent container includes information about RRC protocol context and possibly header compression state information.

As event 6-5, the target RAN allocates resources for the incoming call by setting up a radio access bearer (RAB). Then, as events 6-6 through 6-8, the target RAN sends back to Source RAN a transparent container which includes all radio related information which mobile station (MS) 30 requires for an inter-RAN handover, including RRC protocol context and the configuration options such as those previously discussed with regard to the first mode. The event 6-6 shows the container with its configuration options being sent from the target RAN to the new SGSN (e.g., SGSN $524_1$ in FIG. 5) in a relocation request acknowledge message; event 6-7 shows the container with its configuration options being sent in a forward relocation response message 6-7 from the new SGSN to the old SGSN (e.g., SGSN $514_2$ in FIG. 5); and event 6-8 shows the container with its configuration options being sent in a relocation command message from the old SGSN to the Source RAN. The transparent container with its configuration options is forwarded to mobile station (MS) 30 in the handover command message depicted as event 6-9 in FIG. 6. In response to the relocation command of event 6-8, a relocation commit message is sent from the Source RAN to the target RAN as event 6-10.

As events 6-11 through 6-13, a SRNS context is transferred from the Source RAN to the target RAN. The SRNS context is specifically transferred from the Source RAN to the old SGSN as event 6-11; from the old SGSN to the new SGSN as event 6-12; and from the new SGSN to the target RAN as event 6-13, of packets from the Source RAN to the target RAN is depicted as event 6-14.

As in the first mode of the invention, in the second mode mobile station (MS) 30 decides which header adaptation strategy is to be employed. Such decision or election is depicted as event 6-15 in FIG. 6. Access bursts are made in event 6-16 to establish a physical layer connection in the target cell.

Event 6-17 depicts the target RAN detecting a signal from the mobile station (MS) 30. The detection can be registered at a RNC node or a BSC node of the target RAN, depending on the particular radio access network classification. When the target RAN detects signals from mobile station (MS) 30, the target RAN sends a relocation detect message as event 6-18 to the new SGSN. The core network then switches the user plane from the Source RAN to the target RAN. The GGSN then updates its PDP context accordingly, as reflected by the update PDP context request message of event 6-19 and the update PDP context report message of event 6-20.

When mobile station (MS) 30 has reconfigured itself (e.g., at the physical layer), mobile station (MS) 30 sends the handover complete message of event 6-21 to the target RAN. The handover complete message of event 6-21 includes the election of header adaptation strategy as made at event 6-15. Optionally, the handover complete message can include an indication of the codec which is being used in the case of optimized voice.

An exchange of packets with mobile station (MS) 30 can now commence. The target RAN then, as event 6-22, sends a relocation complete message to the new SGSN, when forwards the indication in a forward relocation complete message (event 6-23) to the old SGSN. The old SGSN then authorizes the Source RAN to release radio resources utilized over the Iu interface (event 6-24), the completion of which is confirmed in a Iu release complete message (event 6-25).

Thus, the present invention also pertains to the radio access network which implements the mobile station-elected header adaptation capability of the present invention, as well as nodes of such networks which cater to such capability and mobile terminals which make and communicate such election. Moreover, in one of its aspects described above, the present invention concerns one or more of the preparation, format, transmission, decoding, and use of the messages which download the configuration options and the return message which apprises the RAN of the mobile-elected header handling strategy.

The invention provides a RAN-independent solution, with minimal signaling and overhead, to the problem of electing between header compression and header removal. Otherwise, dedicated procedures would have to be developed for the non-access stratum and core network functions, and modification would be necessary for the entire call setup process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

TABLE 1

RADIO BEARER SETUP MESSAGE

| Information Element/Group name | Need | Multi | Type and reference | Semantics description |
|---|---|---|---|---|
| Message Type | M | | Message Type | |
| MS Information Elements | | | | |
| RRC transaction identifier | M | | RRC transaction identifier | |
| Integrity check info | C | | Integrity check info | IE shall be set to the used signalling radio bearer identity when the encoded RRC message is used as the MESSAGE parameter in the integrity protection algorithm |
| Integrity protection mode info | O | | Integrity protection mode info | At least 2 spare values, Criticality: reject, are needed The IE is mandatory if the IE "Integrity protection mode command" has the value "start", otherwise it is not needed in the message. The IE is only present if the IE "Integrity protection mode command" has the value "modify" |
| Ciphering mode info | O | | Ciphering mode info | This information element contains the ciphering specific security mode control information. 14 spare values needed. Criticality: criticality reject is needed. |
| Starting time | M | | 44.18-10.5.2.38 Starting time procedures | [Note: replaces the Activation Time that is used in UTRAN.] |
| New G-RNTI | O | | G-RNTI | The G-RNTI (GERAN Radio Network Temporary Identity) is allocated to an MS having a RRC connection and identifies the MS within GERAN |
| RRC state identifier | M | | 43.051 | The element shows the possible states in case of Iu mode |
| CN Information Elements | | | | |
| CN Information info | O | | CN Information info | Identifies the type of core network domain. Enumerated (CS domain, PS domain) |
| GERAN mobility information elements | | | | |
| GRA identity | | | GRA identity | Gives the identity of the GERAN Registration Area |
| RB Information Elements | | | | |
| Signalling RB information to setup list [Note: SRBs are FFS in GERAN] | | 1 to <maxSRB setup> | | For each signalling radio bearer established |
| >Signalling RB information to setup | M | | | |
| RAB information to setup list | O | 1 to <maxRAB setup> | | For each RAB established |
| >RAB information for setup | M | | | |
| RB information to be affected list | O | 1 to <maxRB> | | RB information affected are RB mapping info and RB identity. |
| >RB information to be affected | M | | | |
| RB with PDCP information list | O | 1 to <maxRBall RABs> | | This IE is needed for each RB having PDCP in the case of lossless SRNS relocation |
| >RB with PDCP information | M | | RB with PDCP information | |

TABLE 1-continued

RADIO BEARER SETUP MESSAGE

| Information Element/Group name | Need | Multi | Type and reference | Semantics description |
|---|---|---|---|---|
| Quality target parameters | FFS | | | [Note: QoS parameters are FFS] |
| PhyCH information elements Common paramters for TCH and PDTCH | | | | |
| >TN | M | | Channel description 10.5.2.5-44.018 [FFS] | The TN field (3 bit) is the binary representation of the timeslot number as defined in GSM 05.10. Range: 0 to 7 |
| >ARFCN | M | | Channel description 10.5.2.5-44.018 [FFS] | The ARFCN field (10 bit) is the binary representation of the absolute RF channel number, see 3GPP TS 45.005. Range: 0 to 63 |
| >MAIO | M | | Channel description 10.5.2.5-44.018 [FFS] | The MAIO field (6 bit) is the binary representation of the mobile allocation index offset, see 3GPP TS 45.002. Range: 0 to 63. |
| CHOISE logical channel type | | | | |
| >TCH parameters | C | | | |
| >>channel type | | | Channel description 10.5.2.5-44.018 [FFS] | Channel type field is 5 bits (number of bits needed is FFS) |
| >>TSC | | | Channel description 10.5.2.5-44.018 [FFS] | The TSC field (3 bit) is the binary representation of the training sequence code as defined in 3GPP TS 45.002 |
| >>Indirect encoding of hopping RF channel configuration | | | | |
| >>>MA_NUMBER_IND | | | Channel description 10.5.2.5-44.018 [FFS] | The MA_NUMBER_IND field (1 bit) is the binary representation of the MA_NUMBER to use as reference to a GPRS mobile allocation |
| >>>>CHANGE_MARK_1 | | | Channel description 10.5.2.5-44.018 [FFS] | The CHANGE_MARK_1 field (2 bit) is the binary representation of the allowed value of the SI change mark associated with the GPRS mobile allocation to which the MA_NUMBER refers. Range: 0 to 3. |
| >>Direct encoding of hopping RF channel configuration | | | | |
| >>>MAIO: bit (6) > | | | Channel description 10.5.2.5-44.018 [FFS] | The MAIO field (6 bit) is the binary representation of the mobile allocation index offset, see 3GPP TS 45.002. Range: 0 to 63. |
| >>>HSN | | | Channel description 10.5.2.5-44.018 [FFS] | The HSN field (6 bit) is the binary representation of the hopping sequence number, see 3GPP TS 45.002. Range: 0 to 63. |
| >>Fast_power_control | C | | Boolean Stage2-43.051 | Fast power control parameter which takes two values on or off. |
| >>Coding scheme | | | Enumerated (,) | Modulation schemes used for RB: 43.051 Annex A |

TABLE 1-continued

RADIO BEARER SETUP MESSAGE

| Information Element/Group name | Need | Multi | Type and reference | Semantics description |
|---|---|---|---|---|
| >PDTCH parameters | C | | | |
| >>MEASUREMENT_INTERVAL (5 bit field) | | | | If present, this field is encoded as the MEASUREMENT_INTERVAL field in the PACKET DOWNLINK ASSIGNMENT message in GSM 04.60. This information field indicates the number of block periods from start of the one assigned measurement period to the beginning of the next measurement period. |
| >>LINK_QUALITY_MEASUREMENT_MODE (2 bit field) | | | | This field is encoded as the LINK_QUALITY_MEASUREMENT_MODE in the PACKET DOWNLINK ASSIGNMENT message in GSM 04.60. This field determines the measurements to be included within the EGPRS Timeslot Link Quality Measurements IE 43.051-Annex. A |
| >>PDTCH rate | C | | Enumerated (full, half) | |

TABLE 2

RAB INFORMATION FOR SETUP

| Information Element/Group name | Need | Multi | Type and reference | Semantics description |
|---|---|---|---|---|
| RAB info | MP | | RAB info 10.3.4.8 | |
| RB information to setup list | MP | 1 to <maxRBper RAB> | | |
| >RB information to setup | MP | | RB information to setup 10.3.4.20 | |

TABLE 3

RB INFORMATION TO SETUP

| Information Element/Group name | Need | Multi | Type and reference | Semantics description |
|---|---|---|---|---|
| RB identity | MP | | RB identity 10.3.4.16 | |
| PDCP info | OP | | PDCP info 10.3.4.2 | |
| CHOICE RLC info type | MP | | | |
| >RLC info | | | RLC info 10.3.4.23 | |
| >Same as RB | | | RB identity 10.3.4.16 | Identity of RB with exactly the same RLC info IE values |
| RB mapping info | MP | | RB mapping info 10.3.4.21 | |

TABLE 4

PDCP INFO

| Information Element/Group name | Need | Multi | Type and reference | Semantics description |
|---|---|---|---|---|
| Support for lossless SRNS relocation | CV-Lossless Criteria | | Boolean | TRUE means support |
| Max PDCP SN window size | CV Lossless | | Integer (255, 65535) | Maximum PDCP sequence number window size. The handling of sequence number when the Max PDCP SN window size is 255 is specified in [23]. Default value is 65535. |
| PDCP PDU header | MD | | Enumerated (present, absent) | Whether a PDCP PDU header is existent or not. Default value is "present" |
| Header Adaption information | OP | 1 to <maxPDCPAlgoType> | | Indicates whether header adaptation algorithms can be offered by the RAN. |
| >Header Removal supported | OP | | | Indicates if Header Removal is supported or not. |
| >>Header Removal specific parameters | MD | | | Any Header Removal specific parameters, such as RTP information |
| >RFC3095 supported | OP | | | Header compression according to IETF standard RFC3095 |
| >>>Max_CID | MD | | Integer (1 ... 16383 | Highest context ID number to be used by the compressor. Default value is 15. |
| >>>Profiles | MP | 1 to <maxROHC-Profiles> | | Profiles supported by the decompressor. |
| >>>>Profile instance | MP | | Integer (1 ... 3) | Supported profile types. At least four spare values. |
| >>>MRRU | MD | | Integer (0 ... 65535) | Maximum reconstructed reception unit. Default value is 0 (no segmentation). |
| >>>Packet_Sizes_Allowed | OP | 1 to <maxROHC-Packet Sizes> | | List of packet sizes that are allowed to be produced by RFC 3095. |
| >>>>Packet size | MP | | Integer (2 ... 1500 | Packet size as defined in RFC 3095. |
| >>>Reverse_Decompression_Depth | MD | | Integer (0 ... 65535) | Determines whether reverse decompression should be used or not and the maximum number of packets that can be reverse decompressed by the decompressor. Default value is 0 (reverse decompression shall not be used.) |

TABLE 5

RADIO BEARER SETUP COMPLETE

| Information Element/Group name | Need | Multi | Type and reference | Semantics description |
|---|---|---|---|---|
| Message Type | M | | Message Type | |
| MS information elements | | | | |
| RRC transaction identifier | M | | RRC transaction identifier | |

TABLE 5-continued

RADIO BEARER SETUP COMPLETE

| Information Element/Group name | Need | Multi | Type and reference | Semantics description |
|---|---|---|---|---|
| Integrity check info | C | | Integrity check info | IE shall be set to the used signalling radio bearer identity when the encoded RRC message is used as the MESSAGE parameter in the integrity protection algorithm |
| Uplink integrity protection activation info | O | | Integrity protection activation info | This IE contains the time, in terms of RRC sequence numbers, when a new integrity protection configuration shall be activated for the signalling radio bearers |
| RB Information elements | | | | |
| Header Adaptation info | M | | | Specifies which header adaptation algorithm the MS chose for the RB. |
| >Header Removal | OP | | | If this IE is included then RFC 3095 supported cannot be included. |
| >>Codec negotiated | M | | Enumerated (HR, FR, EFR, AMR) | Indicates which codec was negotiatated by SIP for this radio bearer. 4 spare values. |
| >>Header Removal specific parameters | M | | | Here, the source and destination P address could be included, as well as UDP port number if not conveyed to the RAN by another method. |
| >RFC 3095 | OP | | | If this IE is included then Header Removal supported cannot be included. |
| COUNT-C activation time-FFS | O | | Activation time | Used for radio bearers mapped on RLC-TM. Only applicable if the UE is moving to CELL_DCH state due to this procedure |
| Radio bearer uplink ciphering activation time info | | | RB activation time info | This IE contains the time, in terms of RLC sequence numbers, when a certain configuration shall be activated, for a number of radio bearers |
| Uplink counter synchronisation info (FFS) | O | | | |
| >RB with PDCP information list | O | 1 to <maxRBall RABs> | | This IE is needed for each RB having PDCP in the case of lossless SRNS relocation |
| >>RB with PDCP information | M | | RB with PDCP information | |
| >START list | M | 1 to <maxCN domains> | | START [40] values for all ON domains. |
| >>CN domain identity | M | | CN domain identity | |

TABLE 6

RRC CONNECTION SETUP COMPLETE

| Information Element/Group name | Need | Multi | Type and reference | Semantics description |
|---|---|---|---|---|
| Message Type | MP | | Message Type | |
| UE Information Elements | | | | |
| RRC transaction identifier | MP | | RRC transaction identifier | |

TABLE 6-continued

RRC CONNECTION SETUP COMPLETE

| Information Element/Group name | Need | Multi | Type and reference | Semantics description |
|---|---|---|---|---|
| START list | MP | 1 to <maxCNdomains> | 10.3.3.36 | START [40] values for all CN domains. |
| >CN domain identity | MP | | CN domain identity 10.3.1.1 | |
| >START | MP | | START 10.3.3.38 | START value to be used in this CN domain. |
| UE radio access capability | OP | | UE radio access capability 10.3.3.42 | |
| Other information elements | | | | |
| UE system specific capability | OP | 1 to <maxSystem Capability> | | |
| >Inter-RAT UE radio access capability | MP | | Inter-RAT UE radio access capability 10.3.8.7 | |

TABLE 7

UE radio access capability

| Information Element/Group name | Need | Multi | Type and reference | Semantics description |
|---|---|---|---|---|
| ICS version | MP | | Enumerated (R99) | Indicates the release version of [42]-2 (Implementation Conformance Statement (ICS) proforma specification) that is applicable for the UE. |
| PDCP capability | MP | | PDCP capability 10.3.3.24 | |
| RLC capability | MP | | RLC capability 10.3.3.34 | |
| Transport channel capability | MP | | Transport channel capability 10.3.3.40 | |
| RF capability | MP | | RF capability 10.3.3.33 | |
| Physical channel capability | MP | | Physical channel capability 10.3.3.25 | |
| UE multi-mode/multi-RAT capability | MP | | UE multi-mode/multi-RAT capability 10.3.3.41 | |
| Security capability | MP | | Security capability 10.3.3.37 | |
| UE positioning capability | MP | | UE positioning capability 10.3.3.45 | |
| Measurement capability | CH-fd_req_sup | | Measurement capability 10.3.3.21 | |

TABLE 7-continued

| Condition | Explanation |
|---|---|
| fdd_req_sup | Presence is mandatory if IE Multi-mode capability has the value "FDD" or "FDD/TDD" and a FDD capability update has been requested in a previous message. Otherwise this field is not needed in the message. |

TABLE 8

PDCP capability

| Information Element/Group name | Need | Multi | Type and reference | Semantics description |
|---|---|---|---|---|
| Support for lossless SRNS relocation | MP | | Boolean | TRUE means supported |
| Support for Header Removal | MP | | Boolean | TRUE means supported |
| Support for RFC3095 | MP | | Boolean | TRUE means supported |

What is claimed is:

1. For use in a radio access network which supports radio communication with a mobile station (MS), a method comprising:

(1) sending from the radio network access network to the mobile station (MS) a message that downloads configuration options for each of plural header adaptation strategies for Internet-transmissible packets;

(2) receiving at the radio access network a message which informs the radio access network which of the plural strategies is elected by the mobile station (MS).

2. The method of claim 1, wherein the message of step (1) and the message of step (2) are radio resource control (RRC) messages.

3. The method of claim 2, wherein the message of step (1) is a radio bearer setup message and the message of step (2) is a radio bearer setup complete message.

4. The method of claim 1, wherein the plural header adaptation strategies includes header compression.

5. The method of claim 4, wherein the header compression strategy is for a multimedia service.

6. The method of claim 1, wherein the plural header adaptation strategies includes header removal.

7. The method of claim 6, wherein the header removal strategy is for a spectrum efficient voice packet voice bearer that reuses codec-specific channel coding.

8. The method of claim 1, wherein the radio access network is a GSM/EDGE radio access network.

9. The method of claim 1, wherein the message of step (1) is handover command message for handing over control of the mobile station from a source radio access network to a target radio access network, and the message of step (2) is handover complete message.

10. The method of claim 9, further comprising:

generating, at a target radio access network, the configuration options for each of the plural header adaptation strategies;

sending the configuration options from the target radio access network to a source radio access network; and sending the configuration options from the source radio access network to the mobile station.

11. The method of claim 10, wherein one of the target radio access network and the source radio access network is a GSM/EDGE (GERAN) radio access network and another of the target radio access network and the source radio access network is a UTRAN (Universal Mobile Telecommunications radio access network).

12. The method of claim 1, wherein the Internet-transmissible packets are speech or voice packets having a RTP/UDP/IP header.

13. A radio access network which supports radio communication with a mobile station (MS), the radio access network comprising a network node which (1) sends to the mobile station (MS) a message that downloads configuration options for each of plural header adaptation strategies for Internet-transmissible packets and which (2) receives a message from the mobile station (MS) which informs the radio access network which of the plural strategies is elected by the mobile station (MS).

14. The apparatus of claim 13, wherein the message sent from the radio access network node to the mobile station (MS) and the message received at the radio access network from the mobile station (MS) are radio resource control (RRC) messages.

15. The apparatus of claim 13, wherein the message sent from the radio access network node to the mobile station (MS) is a radio bearer setup message and the message received at the radio access network from the mobile station (MS) is a radio bearer setup complete message.

16. The apparatus of claim 13, wherein the plural header adaptation strategies includes header compression.

17. The apparatus of claim 16, wherein the header compression strategy is for a multimedia service.

18. The apparatus of claim 13, wherein the plural header adaptation strategies includes header removal.

19. The apparatus of claim 18, wherein the header removal strategy is for a spectrum efficient voice packet voice bearer that reuses codec-specific channel coding.

20. The apparatus of claim 13, wherein the radio access network is a GSM/EDGE radio access network.

21. The apparatus of claim 13, wherein the radio access network node is a base station controller (BSC) node.

22. The apparatus of claim 13, wherein the network node is a node of one of a target radio access network and a source radio access network, and wherein the message that downloads configuration options for each of plural header adaptation strategies is a handover command message for handing over control of the mobile station from the source radio access network to the target radio access network and the message which informs which of the plural strategies is elected is a handover complete message.

23. The apparatus of claim 22, wherein the target radio access network generates the configuration options for each of the plural header adaptation strategies and sends the configuration options from the target radio access network to a source radio access network; and wherein the source radio access network sends the configuration options from the source radio access network to the mobile station.

24. The apparatus of claim 23, wherein one of the target radio access network and the source radio access network is a GSM/EDGE (GERAN) radio access network and another of the target radio access network and the source radio access network is a UTRAN (Universal Mobile Telecommunications radio access network).

25. The apparatus of claim 13, wherein the Internet-transmissible packets are speech or voice packets having a RTP/UDP/IP header.

26. A mobile station (MS) which is in radio communication with a radio access network, the mobile station (MS) comprising:
   a transceiver unit which receives a downloading message from the radio access network and sends a return message to the radio access network, the downloading message including configuration options for each of plural for Internet-transmissible packets header adaptation strategies;
   a unit which elects one of the plural header adaptation strategies and includes the elected strategy in a return message.

27. The apparatus of claim 26, wherein the downloading message and the return message are radio resource control (RRC) messages.

28. The apparatus of claim 27, wherein the downloading message is a radio bearer setup message and the return message is a radio bearer setup complete message.

29. The apparatus of claim 26, wherein the plural header adaptation strategies includes header compression.

30. The apparatus of claim 29, wherein the header compression strategy is for a multimedia service.

31. The apparatus of claim 26, wherein the plural header adaptation strategies includes header removal.

32. The apparatus of claim 31, wherein the header removal strategy is for a spectrum efficient voice packet voice bearer that reuses codec-specific channel coding.

33. The apparatus of claim 26, wherein the radio access network is a GSM/EDGE radio access network.

34. The apparatus of claim 26, wherein the message that downloads configuration options for each of plural header adaptation strategies is a handover command message for handling over control of the mobile station from a source radio access network to a target radio access network and the message which informs which of the plural strategies is elected is a handover complete message.

35. The apparatus of claim 34, wherein one of the target radio access network and the source radio access network is a GSM/EDGE (GERAN) radio access network and another of the target radio access network and the source radio access network is a UTRAN (Universal Mobile Telecommunications radio access network).

36. The apparatus of claim 26, wherein the Internet-transmissible packets are speech or voice packets having a RTP/UDP/IP header.

* * * * *